C. T. Warren,
Sawing Stone.
№ 13,805.   Patented Nov. 13, 1855.
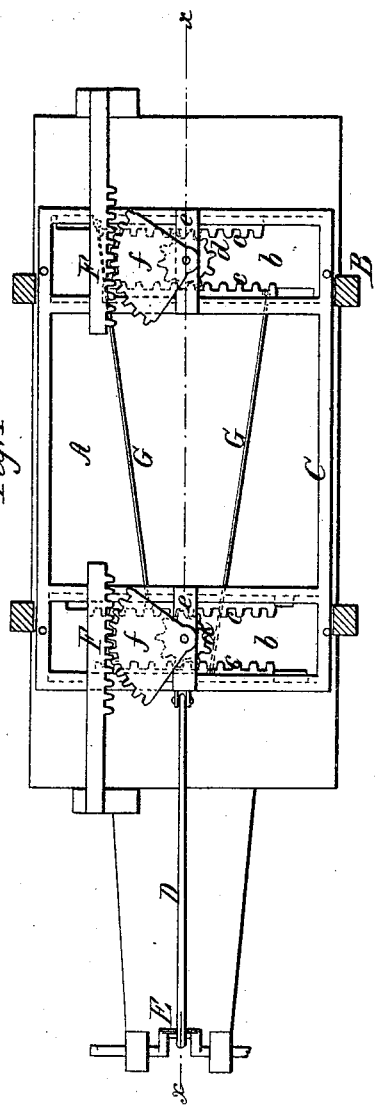
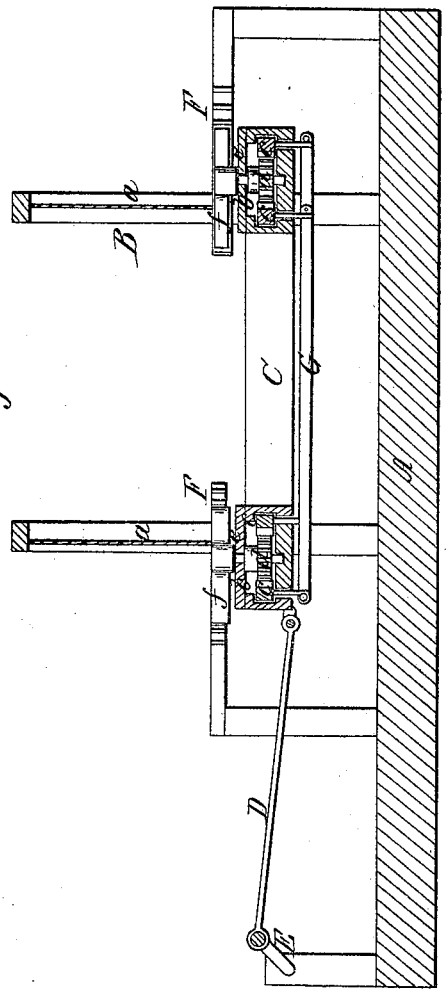

UNITED STATES PATENT OFFICE.

CHARLES T. WARREN, OF MALDEN, MASSACHUSETTS.

MARBLE-SAWING MACHINE.

Specification of Letters Patent No. 13,805, dated November 13, 1855.

*To all whom it may concern:*

Be it known that I, C. T. WARREN, of Malden, in the county of Middlesex and State of Massachusetts, have invented a new and useful Machine for Sawing Marble Blocks in Polygonal Taper Form; and I do hereby declare that the following is a full, clear, and exact description of the same, reference being had to the annexed drawings, making a part of this specification, in which—

Figure 1, is a plan or top view of my improvement, the uprights of the framing being bisected horizontally above the saw frame. Fig. 2, is a longitudinal vertical section of ditto, $(x)$, $(x)$, Fig. 1, showing the plane of section.

Similar letters of reference indicate corresponding parts in the two figures.

The nature of my invention consists in an arrangement of devices whereby the saws are made to move or vibrate laterally, as they work back and forth longitudinally, as will be presently shown and described.

To enable others skilled in the art to fully understand and construct my invention, I will proceed to describe it.

A, represents a bed piece, on which a framing B, is placed, and, C, represents a saw frame, which is suspended within the framing by ropes or chains $(a)$, in the usual way. The saw frame, C, is operated or driven back and forth by means of a pitman, D, and crank E. At each end of the saw frame C, there is a box $(b)$, to the inner surfaces of the sides of which there are attached racks $(c)$, $(c)$, one to each side, and between the two racks in each box a pinion $(d)$ is placed, which pinion gears into both racks. The lower ends of the axes of the pinions work in the bottoms of the boxes $(b)$, and the upper end passes through cross pieces $(e)$, on the top of the boxes, and have geared sectors $(f)$, attached to them, one to each. The sectors $(f)$, gear into racks F, F, one at each end of the bed piece the racks being fitted between ways or guides, attached to uprights on the bed piece.

G, G, are the saws, which are attached to the under sides of the racks $(c)$, $(c)$, each saw being attached to two racks, one in each box, that is, one saw is attached to the back rack in one box, and the front rack in the other box, and the other saw is attached to the front rack in one box, and the back rack in the other box, see Fig. 1.

Operation: The marble block to be sawed is placed upon the bed piece, A, underneath the saws G, G, and motion being given the crank, E, the saw frame, C, is moved back and forth and as the sectors $(f)$, gear into the racks F, F, the sectors will, as the frame, C, moves be turned or moved in a vibratory manner, and the pinions $(d)$, $(d)$, will move the racks $(c)$, $(c)$ in and out and the saws, G, G, will consequently be moved laterally in the saw frame, while they are moving or working longitudinally, and two sides of the block will be cut at the same time in taper form, the quickness of the taper corresponding to the oblique positions of the saws G, G, which are previously set in the saw frame in proper oblique positions, corresponding to the taper intended to be given the marble block.

The saws feed themselves to their work in consequence of the weight of the saw frame, C, which is allowed to descend, as the ropes or chains $(a)$, pass around a drum on the upper part of the framing B, and the racks F, F, are also allowed to descend with the saw frame and may be fitted between guides, or arranged in any proper way.

Different sized gears, or pinions $(d)$, and sectors $(f)$, may be used in order to vary the "quickness" of the taper.

Having thus described my invention, what I claim as new and desire to secure by Letters Patent is—

Giving the saws G, G, a lateral vibrating movement in the saw frame C, as the saw frame and saws work longitudinally by means of the rack $(c)$, pinions $(d)$ geared sectors $(f)$, and racks F, when arranged as described and for the purpose specified, and not otherwise.

CHARLES T. WARREN.

Witnesses:
GILBERT HAVEN,
W. F. HAVEN.